Feb. 23, 1954     C. W. WILDEBOUR     2,669,945
MEANS FOR STRIPING AND RIBBONING ICE CREAM
Filed Jan. 27, 1951
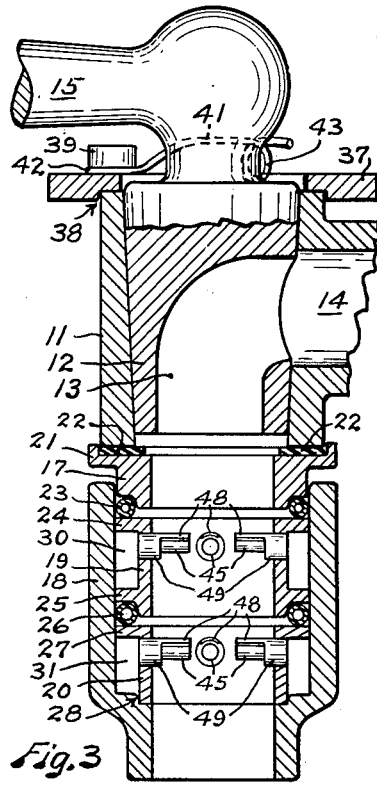
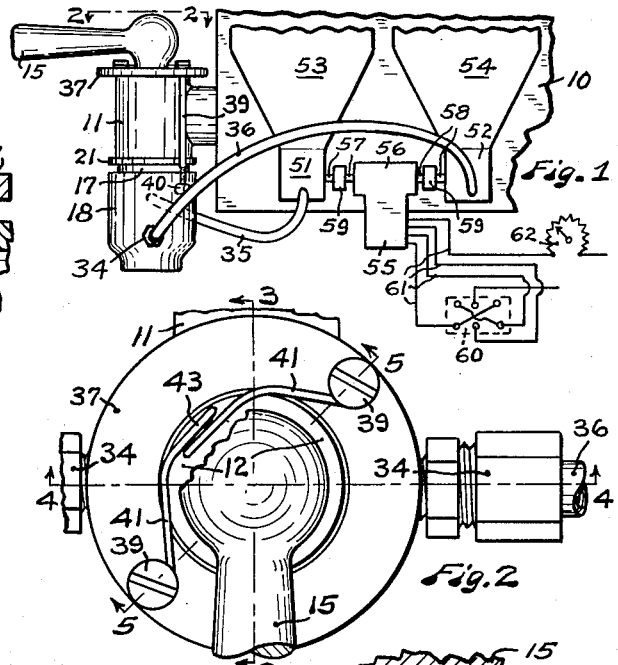
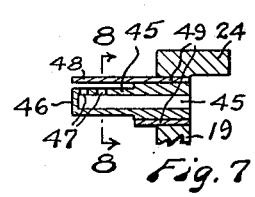
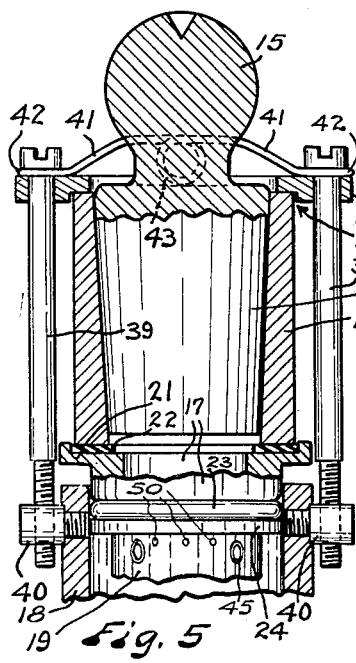
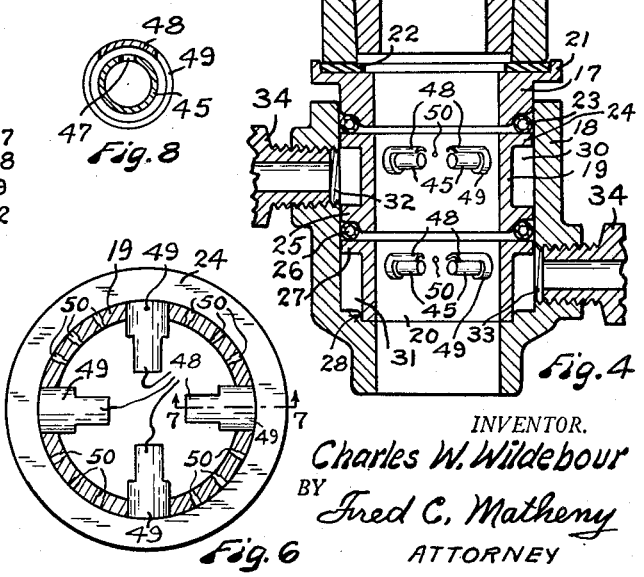
INVENTOR.
Charles W. Wildebour
BY
Fred C. Matheny
ATTORNEY Patented Feb. 23, 1954

2,669,945

UNITED STATES PATENT OFFICE 2,669,945

MEANS FOR STRIPING AND RIBBONING ICE CREAM

Charles W. Wildebour, Seattle, Wash.

Application January 27, 1951, Serial No. 208,115

7 Claims. (Cl. 107—1)

This invention relates to means for striping and ribboning ice cream, ice milk and the like and this invention is in the nature of an improvement on the invention disclosed in my co-pending application Serial No. 130,106, filed November 30, 1949.

The term "ice cream" is used in a broad sense in the following specification and claims to designate ice cream, ice milk or any other like product to which this means can be applied.

An object of this invention is to provide means for simultaneously depositing striping material upon and embedding ribboning material within a column of ice cream, ice milk or the like as the same is being discharged from a container, such as a machine by which it is produced, to and into a dish, carton or the like.

Another object is to provide a striping and ribboning device which is simple in construction and not expensive to manufacture and which is sanitary and is readily dis-assembled for cleaning and sterilizing and is highly efficient in applying striping and ribboning material to ice cream or ice milk at the time it is dispensed to customers.

Another object is to provide striping and ribboning devices which are applicable as an attachment to the valve controlled outlet means of commonly used soft ice cream or ice milk machines, this device having a cylindrical passageway through which the product may be discharged and having manifold chambers for ribboning and striping material communicating with said passageway and having perforations for the inlet of striping material and tubes for the inlet of ribboning material from the manifold chambers to the passageway to provide simultaneous striping and ribboning of the discharging product.

Another object is to provide, in ribboning means of this class, radially disposed inlet tubes for the ribboning material extending into a passageway through which the ice cream or ice milk passes, said tubes having upwardly directed outlet openings to avoid danger of leakage of the ribboning material and having guard members positioned above and spaced from said tubes to prevent the entrance of the ice cream or ice milk into said tubes.

Other objects of this invention will be apparent from the following description taken in connection with the accompanying drawings.

In the drawings Figure 1 is a somewhat diagrammatic view, with parts in elevation, showing this ice cream striping and ribboning apparatus as it may appear when installed on and used in connection with a soft ice cream machine.

Fig. 2 is a top plan view of this ice cream striping and ribboning apparatus, taken substantially on broken line 2—2 of Fig. 1 and on a larger scale than Fig. 1, said Fig. 2 being oriented ninety degrees in a counter-clockwise direction as respects the showing in Fig. 1.

Figs. 3, 4 and 5 are vertical sectional views, with parts broken away and parts shown in elevation, taken substantially on broken lines 3—3, 4—4 and 5—5 of Fig. 2.

Fig. 6 is a detached cross sectional view, on a larger scale than Figs. 2 to 5 inclusive, and with parts in plan showing a sleeve used in this apparatus and showing inlet perforations for striping material and inlet tube means for ribboning material.

Fig. 7 is a fragmentary sectional view taken substantially on broken line 7—7 of Fig. 6 and showing the inlet tube means for ribboning material.

Fig. 8 is a fragmentary sectional view, on a larger scale than Fig. 7 taken substantially on broken line 8—8 of Fig. 7.

Like reference numerals designate like parts throughout the several views.

It will be understood that this means for ribboning and striping ice cream may be used in connection with substantially any ice cream freezer or container from which ice cream is discharged by pressure from valve controlled outlet means.

In the accompanying drawings 10 indicates one well known type of soft ice cream freezing machine having discharge nozzle means including a tubular valve housing 11 within which is disposed an upright tubular rotary faucet type valve member 12. This valve member 12 has a passageway 13 which is adapted to be moved into and out of registration with another passageway 14 in the valve housing 11 by rotary movement of the valve 12. A valve handle 15 is provided for rotatively moving valve member 12 between an open position, in which it is shown in Figs. 1 to 5 and a closed position in which the handle 15 and valve member 12 are in a position substantially at right angles to the position in which they are shown in Figs. 1 to 5. The parts hereinbefore described are standard parts of a soft ice cream machine except that the lower end portion of the valve member 12 is cut off sufficiently so that said valve member 12 does not extend below the lower end of the housing 11.

The ice cream striping and ribboning devices of this invention are in the form of an auxiliary nozzle attachment which is adapted to be installed on the ice cream machine outlet parts above described.

This attachment includes an upper tubular auxiliary housing member 17, a lower tubular auxiliary housing member 18, and two externally flanged sleeves 19 and 20 disposed within the lower tubular auxiliary housing member 18. The upper tubular auxiliary housing member 17 has a recessed top flange 21 in which a washer 22 of packing material is disposed. This washer 22 is pressed against the lower end portion of the valve housing 11 and provides sealing contact therewith. The lower end portion of the upper auxiliary housing member 17 extends into the top end of the lower auxiliary housing member 18 and engages with a rubber packing ring 23 of a type commonly known as an O-ring.

The packing ring 23 rests on an annular integral flange 24 which extends outwardly from the upper end portion of the upper sleeve 19. Another annular integral flange 25 on the lower end portion of the upper sleeve 19 engages with another packing ring 26. The packing ring 26 rests on an outwardly extending integral annular flange 27 on the upper end portion of the lower sleeve 20. The lower end portion of the lower housing member 18 is of reduced diameter and is of substantially the same internal diameter as the sleeves 19 and 20. The lower end portion of the sleeve 20 seats snugly within a recess 28 in the lower end portion of the housing member 18 and makes close enough contact therewith so that no packing is needed at this location.

The external diameter of the sleeves 19 and 20 is substantially less than the internal diameter of the lower housing member 18 and the flanges 24, 25 and 27 are of large enough diameter to fit snugly within the housing 18. This provides an upper annular manifold chamber 30 around the upper sleeve 19 and a lower annular manifold chamber 31 around the lower sleeve 20. The packing rings 23 and 26 cooperate in sealing the manifold chambers 30 and 31 against leakage. Two inlet ports 32 and 33, Fig. 4, communicate with the respective chambers 30 and 31 and are respectively connected by fittings 34 with conduit members 35 and 36, Fig. 1. Material which is to be used for striping and ribboning and which usually is also flavoring material is supplied through the conduits 35 and 36 to the manifold chambers 30 and 31. Means hereinafter described supplies this material under pressure.

A preferred means for securing the auxiliary housing members 17 and 18 to the valve housing means 11 of the soft ice cream machine is best shown in Fig. 5. This securing means comprises a washer shaped ring 37 which has, in its lower side, an annular groove 38 of inverted L shape adapted to fit over the top end portion of the valve housing 12. Preferably two shackle bolts 39 extend downwardly through the ring 37 and are threaded into two lugs or bosses 40 which are rigid with the lower auxiliary housing member 18. Obviously tightening of the bolts 39 will draw the auxiliary housing members 17 and 18 tightly together and tightly against the lower end of the valve housing means 11.

Because the lower end portion of the valve member 12 is cut off to provide clearance for installation of the auxiliary housing members 17 and 18 it is necessary to provide valve holding means to hold this valve member 12 down in the valve housing 11. The valve holding means shown in the drawings is in the nature of a spring wire 41 having its two opposite end portions bent to form rings 42 through which the shackle bolts 39 pass and having its medial portion bent to form a downwardly extending resilient loop 43 which rests upon the top end portion of the valve member 12 and holds the same down in the housing 11.

Each flanged sleeve 19 and 20 is provided adjacent its upper end with a plurality of radially positioned spaced apart ribboning tubes 45 which communicate with one of the annular manifold chambers 30 or 31 and which extend through the wall of the sleeve and inwardly toward the axis of the sleeve. Four of these ribboning tubes 45 are shown in each sleeve 19 and 20 but it will be understood that the number of tubes 45 in each sleeve may be varied. Each tube 45 has a closed inner end 46 and has one or more upwardly directed ribboning material outlet holes 47. The outlet holes 47 are directed upwardly to avoid leakage of ribboning material therefrom when no ribboning material is being ejected from the tubes. A convex guard member 48 is positioned a short distance above each tube 45 to prevent downwardly moving ice cream from entering the tube 45 through the outlet holes 47. These guard members 48 also spread the ribboning material and cause it to be deposited in a more uniform and pleasing manner in the downwardly moving column of ice cream.

For convenience in manufacture, the inner end portions of the tubes 45 are preferably turned down so as to leave the outer end portions thereof larger in diameter. Each guard member 48 is preferably formed as an integral part of a sleeve or jacket 49 which fits tightly over and is secured to the larger portion of one of the tubes 45. The tubes 45 with the jackets 49 thereon may be pressed into suitable openings in the walls of the sleeves 19 and 20.

A plurality of spaced apart stripping material inlet perforations 50 of small diameter are provided in the wall of each sleeve 19 and 20 to admit fine jets of colored material for striping purposes from one of the manifold chambers 30 or 31 into the sleeve 19 or 20.

When the valve 12 is moved to an open position and at the same time soft or plastic colored material which is to be used for ribboning, striping and flavoring purposes is admitted under pressure to the manifold chambers 30 and 31 then, as a column of ice cream moves downwardly through the sleeves 19 and 20, a substantial amount of the colored material will be forced inwardly through the openings or small perforations 50 and deposited in the form of stripes on the exterior of the moving column of ice cream. At the same time a substantial amount of the colored material will be extruded into the ice cream through the openings 47 in the tubes 45 to ribbon and flavor the ice cream. The ice cream which is being withdrawn from the ice cream machine 10 may thus be delivered into a dish or like receptacle fully flavored and in a very attractive striped and ribboned condition.

The two conduit members 35 and 36 are respectively connected with pumps 51 and 52 which communicate respectively with the lower end portions of the receptacles 53 and 54. Two differently flavored ribboning and striping materials which are also of different colors may be stored in the receptacles 53 and 54. It is not essential that the materials used for striping, ribboning and flavoring purposes should be refrigerated.

When two receptacles 53 and 54 for ribboning and striping material are used in the manner illustrated in Fig. 1 these two receptacles preferably are positioned so that the pumps 51 and 52 are in side by side spaced apart relation. Pump driving means preferably in the form or a reversible electric motor 55 operates through speed reduction means 56 and two lines of shafting 57 and 58 to drive the pumps 51 and 52. Preferably a ratchet clutch 59 is used in connection with each line 57 and 58 of shafting so that whenever the reversible motor 55 is operated one pump will be driven and the other pump will remain idle and the direction of rotation of the motor 55 will determine which pump is to be operated.

Preferably a reversing switch 60 is provided to control the supply of electric current through circuit wires or conductors 61 to the reversible motor 55. A rheostat 62 in the circuit of the motor 55 provides means for adjusting the speed of said motor. This makes it possible to vary the rate of delivery of the striping, ribboning and flavoring materail so that more or less of this material, as desired can be introduced into the ice cream.

The reversing switch 60 provides a selective control by which the motor 55 may be de-energized or may be caused to rotate in either selected direction. Each ratchet clutch 59 will only transmit rotation in one direction and these clutches are arranged so that either pump 51 or 52 may be driven, depending on the direction of rotation of the motor 55, but the two pumps can not be driven at the same time. The receptacles 53 and 54 preferably contain striping, ribboning and flavoring material of two different flavors and two different colors and the operator has the choice of drawing plain ice cream without any striping, ribboning or flavoring material therein or of striping, ribboning and flavoring the ice cream with material from either selected receptacle.

It will be understood that the receptacles 47 and 48 may be placed at any desired location and that the reversing switch 60 and rheostat 62 may be positioned at any convenient location and may be adapted for either hand or foot control. If foot control of switch 60 is provided then both hands of the operator are left free for use in operating the valve 12 and holding a receptacle when drawing off ice cream.

Providing striping and ribboning means for use in connection with the ice cream delivery nozzle of an ice cream machine makes it possible to withdraw ice cream directly from a freezing machine and to ribbon and stripe and flavor the same and deliver it into receptacles, such as dishes, cones or cartons, in which the ice cream is dispensed. This makes it possible to eliminate the ribboning machines ordinarily used in factories where large quantities of ice cream is made and also makes it possible to supply striped and ribboned ice cream from small ice cream machines of the type commonly used by retail establishments who freeze their own ice cream.

The foregoing description and accompanying drawings clearly disclose a preferred embodiment of this invention but it will be understood that this disclosure is illustrative and that changes in the invention may be made within the scope of the following claims.

I claim:

1. In ice cream striping and ribboning means, an upright tubular ice cream discharge conduit having a plurality of relatively small perforations disposed in spaced apart relation around said conduit and extending from exterior to interior thereof; a ribboning material inlet tube extending through a wall of said conduit and protruding into said conduit and having an upwardly directed discharge opening for ribboning material positioned within said conduit; manifold chamber means external to said ice cream discharge conduit and embracing said perforations and the inlet to said ribboning material inlet tube; and means adapted to supply striping and ribboning material under pressure to said manifold chamber means, whereby the striping and ribboning material will be forced inwardly through said perforations and said tube for striping and ribboning ice cream which is passing through said tubular ice cream discharge conduit.

2. In ice cream striping and ribboning means, a tubular ice cream discharge conduit having a plurality of longitudinally spaced apart sets of relatively small perforations disposed in rings around said conduit with the perforations of each set positioned in spaced apart relation around said conduit and extending from exterior to interior thereof; at least one ribboning material inlet tube extending through a wall of said conduit in the general plane of each set of perforations and protruding into said conduit and having a discharge opening for ribboning material positioned within said conduit; an independent manifold extending around said conduit at the location of each set of perforations and communicating with the perforations and the ribboning material inlet tubes associated therewith; and independent striping and ribboning material supply means connected with each manifold, whereby striping and ribboning material of different characteristics may be supplied selectively to each set of perforations and ribboning material inlet tubes for selective flavoring and striping of the ice cream.

3. In ice cream striping and ribboning means, a tubular housing; ice cream supply means connected with said housing; externally flanged sleeve means of smaller diameter than said housing disposed within said housing providing an annular manifold chamber around said sleeve, at least one flange on said sleeve means being circular and fitting snugly within said annular housing and forming an end wall of said manifold chamber and said sleeve means having a plurality of relatively small perforations in the wall thereof disposed in spaced apart relation around said sleeve communicating with said manifold chamber and with the interior of said sleeve; ribboning material inlet tube means communicating with said manifold chamber and extending through the annular wall of said sleeve and protruding into said sleeve and having a ribboning material discharge opening positioned within said sleeve; and pressure actuated supply means connected with said housing adapted to supply striping and ribboning material under pressure to said manifold, whereby striping and ribboning material may be forced through said perforations and said tube for striping and ribboning ice cream which is passing through said sleeve means.

4. An attachment for use in connection with an ice cream machine discharge nozzle, which nozzle includes a cylindrical valve housing having a valve therein, comprising a lower auxiliary tubular housing member adapted to be positioned below said valve housing; a plurality of externally flanged perforated sleeves of small diameter than said lower auxiliary housing member disposed within said lower auxiliary housing member and having spaced apart circular external flanges fitting snugly therein and cooperating therewith to provide a plurality of manifold chambers extending around said sleeves; an upper auxiliary housing member extending into said lower auxiliary housing member and positioned between said lower auxiliary housing member and the lower end of said valve housing; packing washer means provided between the lower end of the valve housing and the upper end of the upper auxiliary housing member and between the lower end of the upper auxiliary housing member and the upper sleeve and between the several sleeves within the lower housing member; and shackle bolt means securing said lower auxiliary housing member to said valve housing; said shackle bolt means holding said auxiliary housing members and sleeves in assembled relation and compressing said packing washer means.

5. An attachment for use in connection with a cylindrical tubular valve housing of the discharge nozzle of an ice cream machine, comprising two relatively telescopic auxiliary housing members disposed below the valve housing in end to end relation thereto, one of said housing members having an internal sleeve supporting shoulder; perforated sleeve means within said internally shouldered housing member between the sleeve supporting shoulder thereof and the end of the other housing member; a washer shaped ring supported on the upper end of said valve housing and overhanging the same; and shackle bolts connecting said washer shaped ring and the lowermost telescopic auxiliary housing member, whereby said two auxiliary housing members are secured to said valve housing and said sleeve means is clamped within and between said two auxiliary housing members.

6. The apparatus as claimed in claim 5 in which a rotary valve having an exposed upper end portion is operatively disposed in the valve housing and a spring wire valve holding member is provided to hold said valve member in said valve housing, said valve holding member having two end loops secured respectively to the shackle bolts and having an intermediate downwardly directed spring loop positioned in engagement with the exposed upper end portion of the valve member.

7. In ice cream ribboning means, an upright tubular conduit; means supplying ice cream in a downward direction through said conduit; a ribboning tube extending into said conduit, said ribboning tube having an upwardly directed ribboning material outlet opening; and a guard member positioned in spaced relation above the portion of said tube in which said opening is disposed, whereby ice cream moving downwardly in said conduit will be deflected away from said opening.

CHARLES W. WILDEBOUR.

References Cited in the file of this patent
UNITED STATES PATENTS

| Number | Name | Date |
| --- | --- | --- |
| 163,828 | Wenzel | May 25, 1875 |
| 279,131 | Chase | June 12, 1883 |
| 692,493 | Uckotter | Feb. 4, 1902 |
| 2,246,871 | Balch | June 24, 1941 |
| 2,389,084 | Routh | Nov. 13, 1945 |
| 2,527,273 | Marks | Oct. 24, 1950 |